US005612854A

United States Patent [19]
Wiscombe et al.

[11] Patent Number: 5,612,854
[45] Date of Patent: Mar. 18, 1997

[54] COMPUTER POWER SUPPLY APPARATUS

[75] Inventors: Nathan Wiscombe, Cedar Park; Arthur Lopez; Victor Pecone, both of Austin, all of Tex.

[73] Assignee: Dell USA, L.P., Austin, Tex.

[21] Appl. No.: 378,126

[22] Filed: Jan. 24, 1995

[51] Int. Cl.[6] .............................. H05K 5/02; H05K 7/14; G06F 1/16

[52] U.S. Cl. .......................... 361/727; 361/683; 361/724

[58] Field of Search .................................... 361/724–727, 361/683, 684, 685, 686, 687; 364/708.1; G06F 1/16

[56] References Cited

U.S. PATENT DOCUMENTS

| | | | |
|---|---|---|---|
| 4,754,397 | 6/1988 | Varaiya et al. | 361/726 |
| 4,967,311 | 10/1990 | Ferchau et al. | 361/727 |
| 5,331,509 | 7/1994 | Kikinis | 361/686 |
| 5,381,315 | 1/1995 | Hamaguchi et al. | 361/727 |
| 5,392,192 | 2/1995 | Dunn et al. | 361/683 |
| 5,460,441 | 10/1995 | Hastings et al. | 361/726 |

Primary Examiner—Leo P. Picard
Assistant Examiner—Lynn D. Field
Attorney, Agent, or Firm—Haynes and Boone, L.L.P.

[57] ABSTRACT

A computer is provided with a redundant power supply system using a plurality of power supply boxes having generally conventional, off-the-shelf configurations. The computer includes a housing having a wall opening spaced apart from and facing the side of a paralleling type circuit board having mounted thereon a plurality of AC electrical connectors and a spaced plurality of DC electrical connectors. The power supply boxes are mounted on carrier structures slidably received in the computer housing for drawer-like movement through the housing wall opening toward and away from the circuit boards. Each power supply box has an external wire bundle with blind mate DC electrical connectors mounted on the outer ends of its leads and supported by the carrier structure for mating connection with their associated circuit board connectors when the carrier structure is moved into adjacency with its associated circuit board. The carrier structure also supports an AC connector structure which is mated with its associated circuit board connector in response to such movement of the carrier structure. A switch carded by each carrier structure is operative to selectively enable and disable its associated power supply box and releasably lock the carrier structure to the computer housing.

22 Claims, 5 Drawing Sheets

COMPUTER POWER SUPPLY APPARATUS

BACKGROUND OF THE INVENTION

The present invention generally relates to computer apparatus, and more particularly relates to power supply structures incorporated in computers.

A basic component typically incorporated in a computer is a power supply box that functions to receive AC electrical power from an external source thereof and transform the received power to a relatively low DC voltage that may be fed to various electronic components such as circuit boards, disposed within the computer, via an appropriate outlet wire bundle extending outwardly from the power supply box and having suitable connectors on the outer ends of the wire bundle leads. Power supply boxes of this general type are sold by various manufacturers in a wide variety of mass produced standard configurations. Because of the quite low cost per watt of these standard configuration power supply boxes they have been very attractive to many computer manufacturers who purchase large quantities of these commercially available structures and simply incorporate them in their finished computers. This use of off-the-shelf power supply boxes by computer manufacturers works well, and substantially reduces the overall manufacturing cost of the finished product, in the case of relatively small personal computers in which only a single power supply box. However, in larger capacity computers such as rack-mounted computer systems it is often desirable to provide the computer with a redundant power supply system, utilizing a plurality of power supply boxes, that functions to assure a continuing power source to the computer system in the event that one of the multiple power supply units fails.

This redundant power supply requirement typically precludes the use of standard off-the-shelf power supply boxes and requires, instead, that custom-designed power boxes (specially designed and fabricated by either the power supply manufacturer or the computer manufacturer) be utilized in conjunction with paralleling circuit boards within the chassis housing the power supply equipment to provide the desired redundant power supply characteristics. The necessity of custom designing special power supply boxes for such a redundant power supply application greatly increases the cost per watt for each power supply box, thereby undesirably increasing the overall cost of fabricating the particular computer system utilizing the specially designed power supply boxes.

It can be seen from the foregoing that it would be highly desirable to provide an improved redundant computer power supply system that can economically utilize a plurality of standard, off-the-shelf power supply boxes. It is accordingly an object of the present invention to provide such an improved power supply system.

SUMMARY OF THE INVENTION

In carrying out principles of the present invention, in accordance with a preferred embodiment thereof, a computer is provided with a redundant power supply system utilizing a plurality of power supply boxes having generally conventional, off-the-shelf configurations. This unique ability to use conventionally configured power supply boxes in a redundant power supply application is provided by the use of specially designed carrier structures on which the power supply boxes are mounted.

The computer representatively includes a housing having an exterior wall opening that is spaced apart from a plurality of generally coplanar paralleling type circuit boards disposed within the first housing and having sides that face the wall opening. Mounted on each circuit board side is an AC connector and a spaced plurality of DC connectors.

Each conventionally configured power supply box has a housing portion with from and rear end walls. A wiring bundle extends outwardly from the rear end wall, with appropriate groups of the outer bundle lead ends being operatively connected to a plurality of blind mate type DC electrical connectors. An AC electrical connector is operatively mounted on the front end wall of the power supply box housing.

Each carrier structure is mounted on the computer housing for drawer-like movement through its wall opening toward and away from the circuit board sides, supports one of the power supply box housings for movement therewith relative to the computer housing, and includes wall means for supporting the power supply box DC connectors in an aligned relationship with the DC connectors on an associated circuit board in a manner such that when the carrier structure is moved into adjacency with the circuit board a blind mating connection is made between the DC connectors on the carrier structure and the associated DC connectors on the circuit board. The wall means also support an AC electrical connector which, in response to such movement of the carrier structure, is blind mated with the corresponding AC electrical connector which is in close proximity to the circuit board.

A suitable power wire coupled to the AC connector supported by the carrier structure wall means has an AC plug member that is removably connected to the AC connector disposed on the front end wall of the power supply box housing. Accordingly, AC electrical power from an external source thereof is operatively fed to the power supply box via the mated circuit board and carrier structure AC connectors, the power wire, and the AC plug member. Conventional power transformation means within the power supply box housing convert the received AC electrical power to relatively low voltage DC electrical power that is transmitted via the wire bundle leads to the circuit board associated with the particular power supply box.

According to another feature of the invention, switch means are mounted on each of the carrier structures. In a preferred embodiment thereof, each of the switch means is operative to (1) selectively enable and disable its associated power supply box, and (2) releasably lock its associated carrier structure to the computer housing when the carrier structure is inwardly moved through the computer housing into adjacency with its associated paralleling type circuit board.

DETAILED DESCRIPTION

Figure 1:
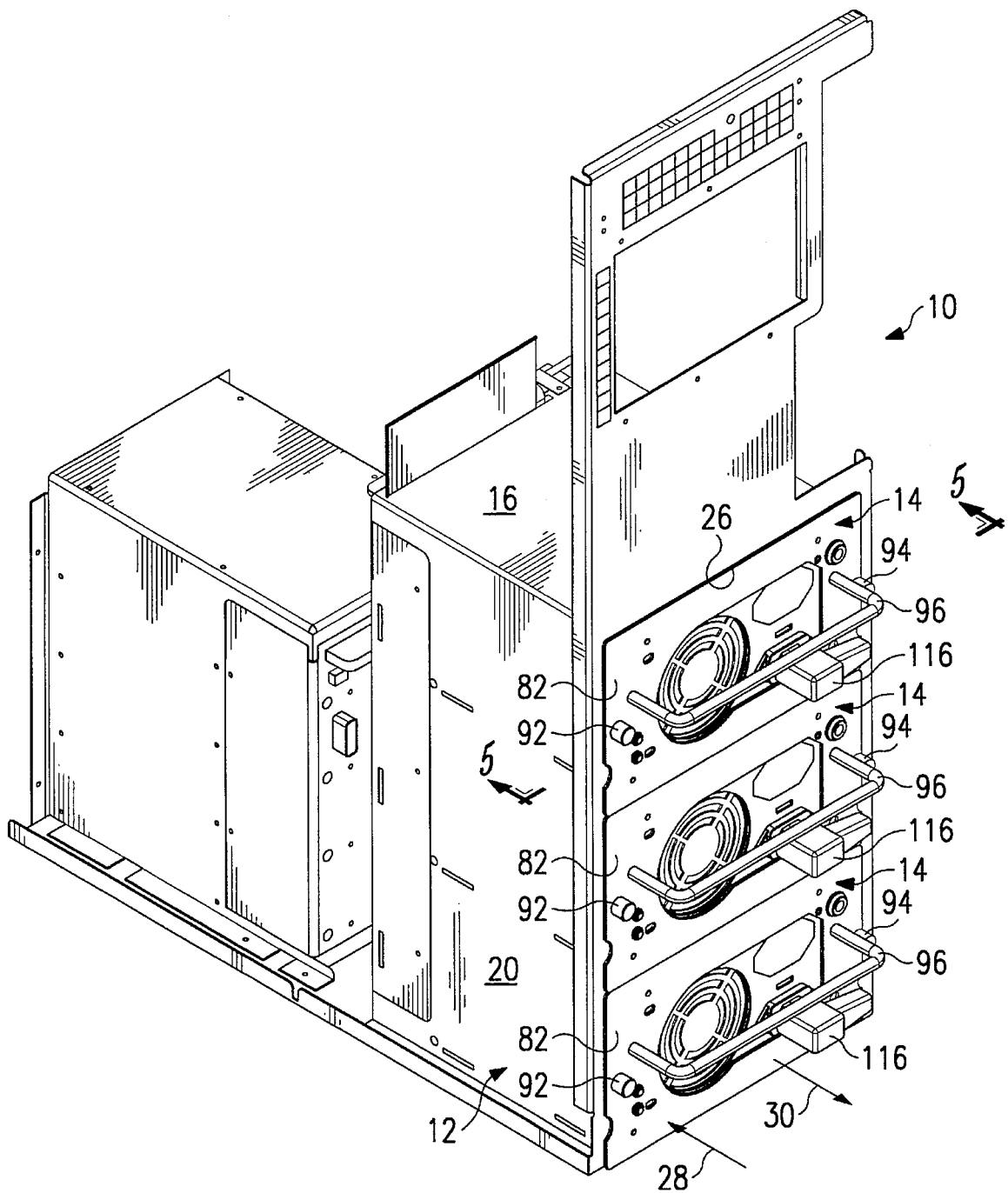
FIG. 1 is a front side perspective view of a representative computer chassis structure having incorporated therein three removable, slide-in power supply assemblies embodying principles of the present invention.
Figure 2:
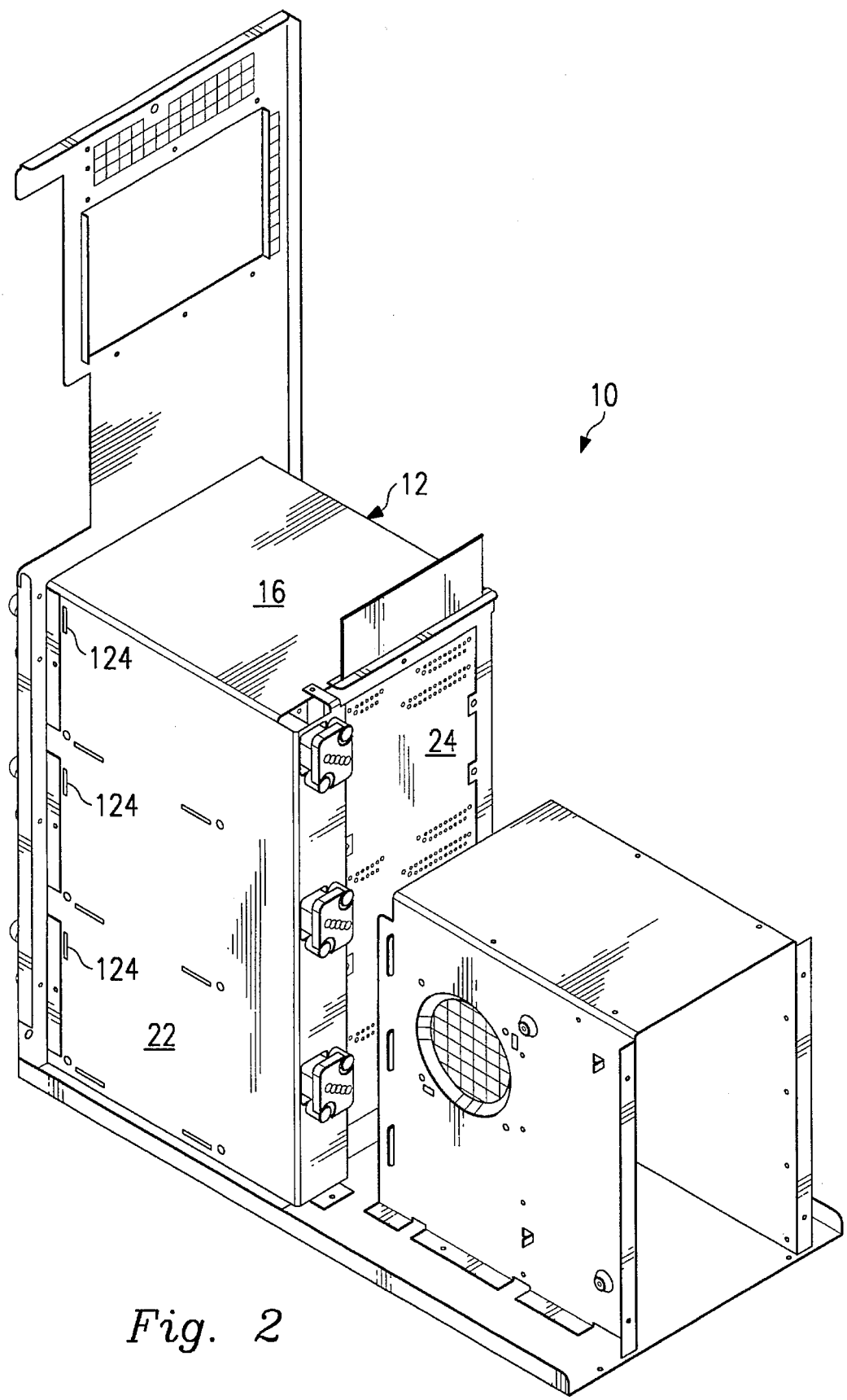
FIG. 2 is a rear side perspective view of the chassis structure.

Perspectively illustrated in FIGS. 1 and 2 is a representative computer chassis structure 10 having a vertically elongated, rectangular rack-type front housing section 12 in which three slide-out power supply assemblies 14 embodying principles of the present invention are disposed drawer-like in a vertically stacked orientation. The housing section 12 has a top end wall 16, a bottom end wall 18 (see FIG. 5), opposite left and right side walls 20 and 22, a rear side wall 24, and a front side opening 26. In a manner subsequently described, each of the power supply assemblies 14 may be inserted inwardly through the front side opening 26, into the interior of the housing section 12, as indicated by the arrow 28 in FIG. 1, and outwardly removed through the front side opening 26 as indicated by the arrow 30 in FIG. 1.

Figure 3:
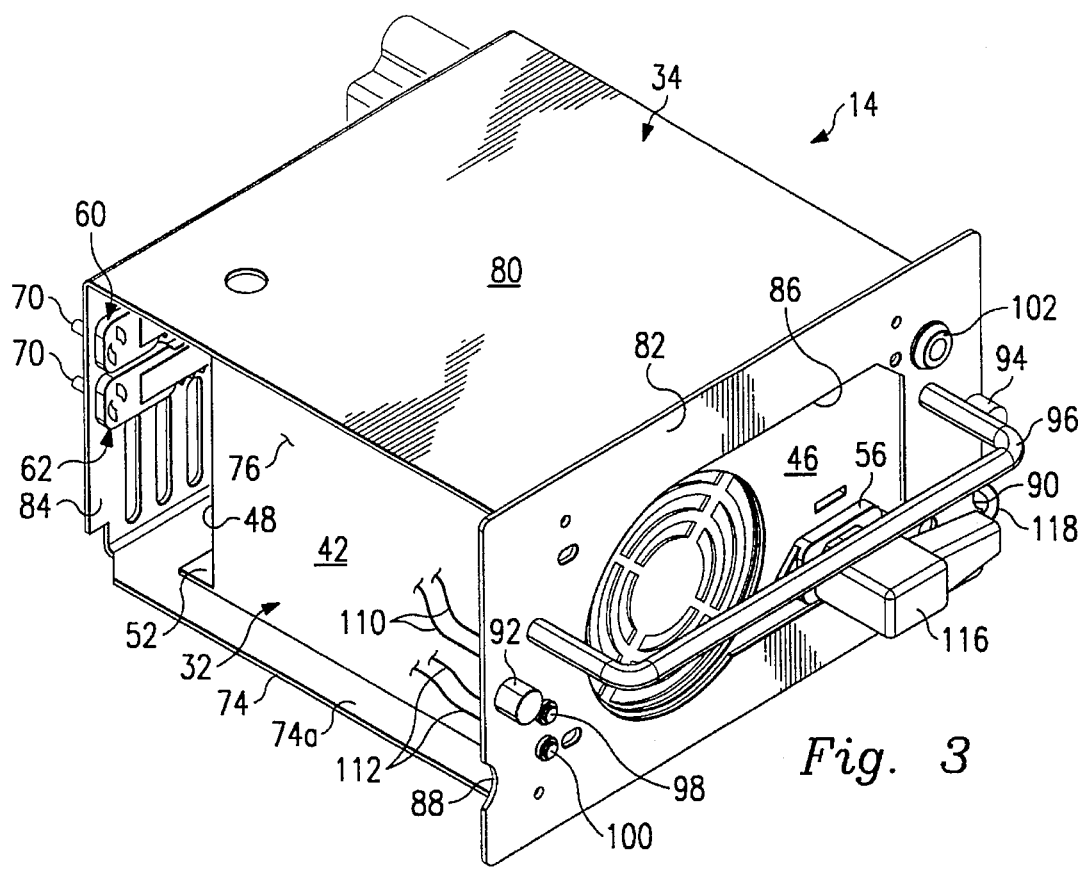
FIG. 3 is an enlarged scale front side perspective view of one of the power supply assemblies removed from the chassis structure, the power supply assembly including a power supply box removably supported in a carrier portion of the assembly.
Figure 3A:
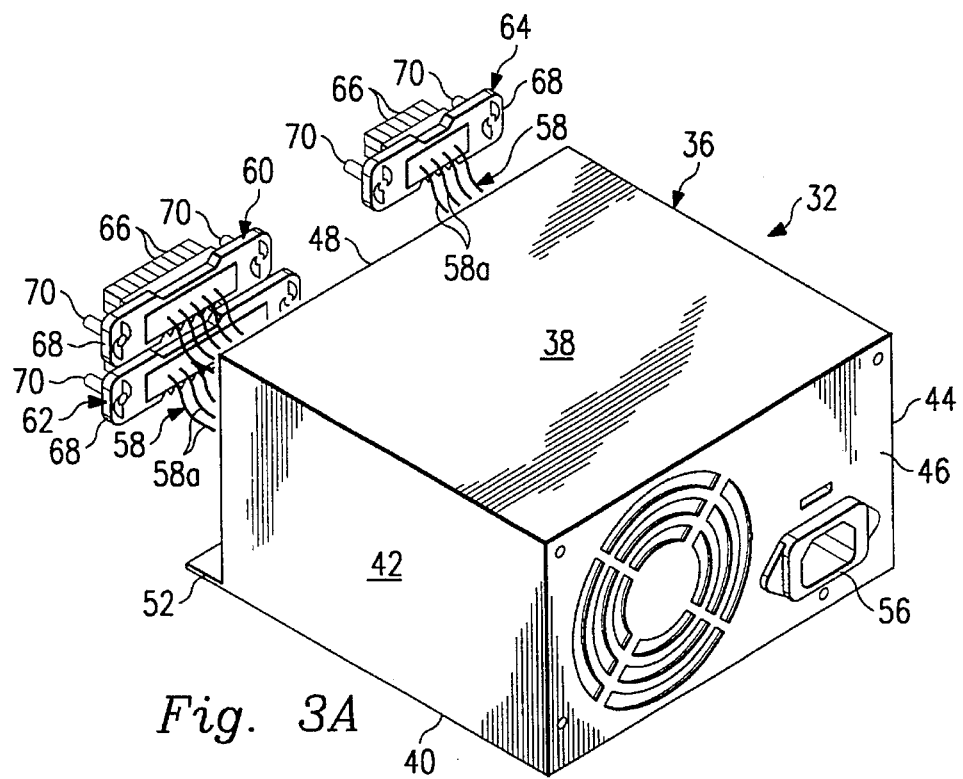
FIG. 3A is a front side perspective view of the power supply box removed from its associated carrier portion.
Figure 4:
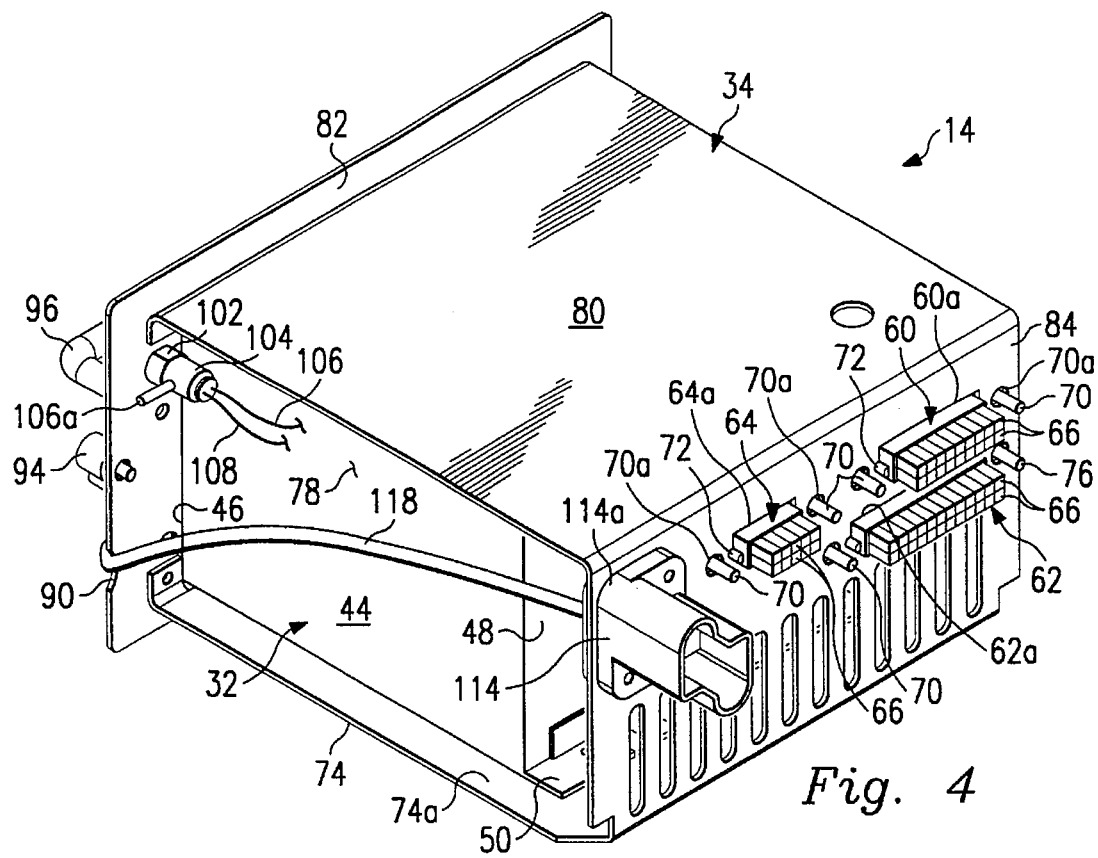
FIG. 4 is a rear side perspective view of the power supply assembly shown in FIG. 3.
Figure 4A:
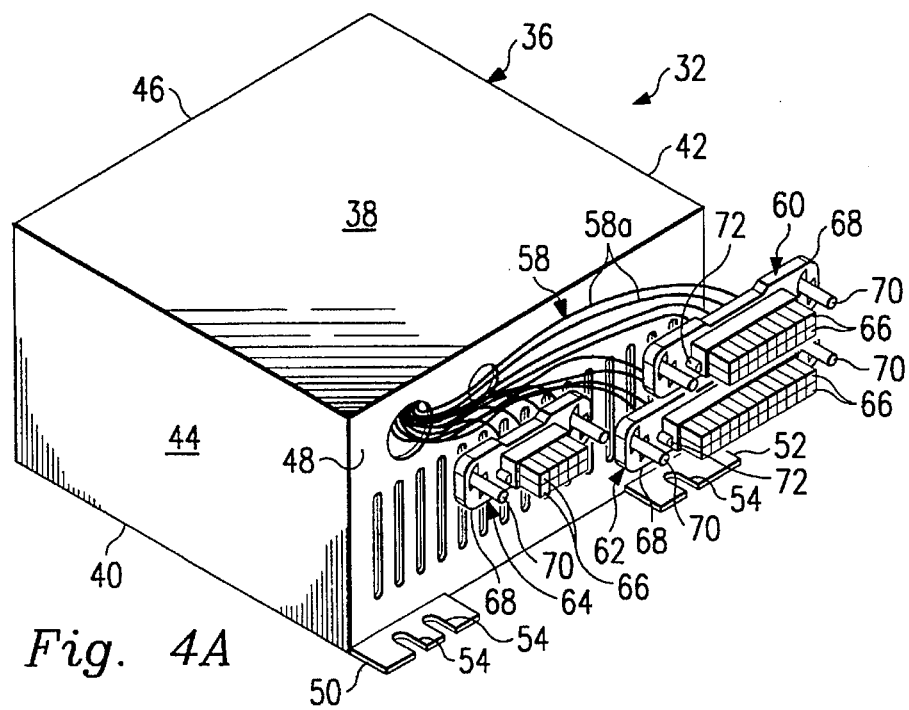
FIG. 4A is a rear side perspective view of the power supply box shown in FIG. 3A.

Referring now to FIGS. 3–4A, each of the power assemblies 14 (see FIGS. 3 and 4) includes a generally conventional power supply box 32 removably disposed within a specially designed carrier structure 34 that embodies principles of the present invention. The power supply box 32 is shown removed from the carrier structure 34 in FIGS. 3A and 4A, is of a generally conventional off-the-shelf design, and comprises a rectangular metal housing 36 having top and bottom side walls 38 and 40, opposite left and right side walks 42 and 44, and front and rear end walks 46 and 48. Spaced apart portions of the bottom side wall 40 are rearwardly extended past the rear side wall 48 to form mounting tabs 50,52 having slots 54 therein.

Disposed within the power supply box housing 36 are conventional voltage transformation means (not shown) which operate to receive AC electrical power from an external source, via a suitable AC socket 56 mounted on the front housing side wall 46, and convert the received AC power to a relatively low voltage DC output. The DC output is transmitted from the voltage transformation means via one or more wire bundles 58 extending outwardly from the rear housing side wall 48 and having individual electrical leads 58a. Appropriate groups of the leads 58a are connected to male blind-mate or "drawer" connectors 60, 62 and 64 representatively having mutually different numbers of connector pin portions 66 projecting outwardly from body sections 68 of the connectors. The incorporation of the blind-mate connectors 60,62,64 in the power supply box 32 represents the only substantial modification of the power supply box from its standard, "off-the-shelf" configuration. Since the power supply box is typically provided by its manufacturer with other types of connectors at the outer ends of its DC output leads 58a, this modification does not appreciably change the desirably low cost of this mass produced computer component. Also projecting outwardly from each of the connector body sections 68 are spaced pairs of alignment pins 70 and resilient mounting tabs 72.

Referring now to FIGS. 3 and 4, each of the power supply boxes 32 is removably supported within an associated one of the carrier structures 34 embodying principles of the present invention. Each of the carrier structures 34 is formed from a suitable metal material and defines a generally rectangular support structure having a horizontal bottom side wall 74 having opposite side edge portions 74a, opposite left and fight side openings 76 and 78, a horizontal top side wall 80, a vertical from end wall 82 extending between front side edges of the walls 74 and 80, and a vertical rear end wall 84 extending between rear side edges of the walls 74 and 80.

The front side wall 82 has a relatively large central opening 86 formed therein, a pair of arcuate notches 88,90 respectively formed in left and fight side edge portions thereof adjacent a pair of thumb screws 92,94 captively retained on the wall 82, and a forwardly projecting, generally U-shaped pull handle 96. A pair of LED indicating lights 98,100 are mounted on a lower left corner portion of the front side wall 82, and a key operated switch 102 is mounted on an upper right corner portion of the from side wall 82. The switch 102 has a cylindrical body 104 disposed behind the front side wall 82 as best illustrated in FIG. 4, the body portion 104 having an outwardly projecting transverse locking pin 106a thereon. In response to rotation of a key (not shown) operatively inserted into the switch 102, the body 104 is rotatable between a locking position (illustrated in FIG. 4) in which the pin 106 is horizontally disposed, and an unlocking position in which the pin is vertically disposed.

The power supply box 32 is positioned within the interior of the carrier structure 34, with the front wall 46 of the power supply box positioned against the inner side of the carrier structure front end wall 82, the rear wall 48 of the power supply box 32 forwardly spaced apart from the rear wall 84 of the carrier structure 34, and the AC socket 56 projecting outwardly through the wall opening 86 of the carrier structure 34. The bottom side wall 40 of the power supply box 32 rests on the top side of the bottom carrier structure side wall 74, and the power supply box 32 is removably secured in place within the carrier structure 34 by screws (not visible in the drawings) extending downwardly through the tab slots 54 and threaded into the bottom side wall 74 of the carrier structure 34.

Turning now to FIG. 4, the rear end wall 84 of the carrier structure 34 has three openings 60a, 62a and 64a that respectively and complimentarily receive the connector pin sections of the connectors 60, 62 and 64 which project rearwardly beyond the rear carrier structure side wall 84. When the connector pin sections of the connectors 60, 62 and 64 are pushed outwardly through their associated openings 60a,62a, and 64a the resilient mounting tabs 72 on the connectors 60, 62 and 64 snap outwardly over the exterior surface of the carrier structure rear side wall 84 to removably lock the connectors 60, 62 and 64 in place on the wall 84 in predetermined locations thereon. The alignment pin portions 70 of the connectors project outwardly through small circular openings 70a in the wall 84 as indicated.

For purposes later described, electrical leads 106,108 are routed from the switch 102 to the blind-mate connector 64, and the connector 64 is electrically coupled to the indicating lights 98,100 by lead pairs 110,112 (see FIG. 3). A first AC electrical plug 114 (see FIG. 4) is coupled to a second AC electrical plug 116 (see FIG. 3) by a suitable power wire 118. A body portion of the plug 114 is removably anchored within a complimentarily configured opening 114a formed in the rear carrier structure side wall 84 (see FIG. 4), with the remainder of the plug 114 projecting outwardly beyond the wall 84. The plug 116 (see FIG. 3) is removably inserted into the AC socket 56, and the power wire 118 which interconnects the plugs 114,116 is routed rearwardly through the side edge notch 90 and then extended rearwardly along one side of the carrier structure 34 to the plug 114.

Figure 5:
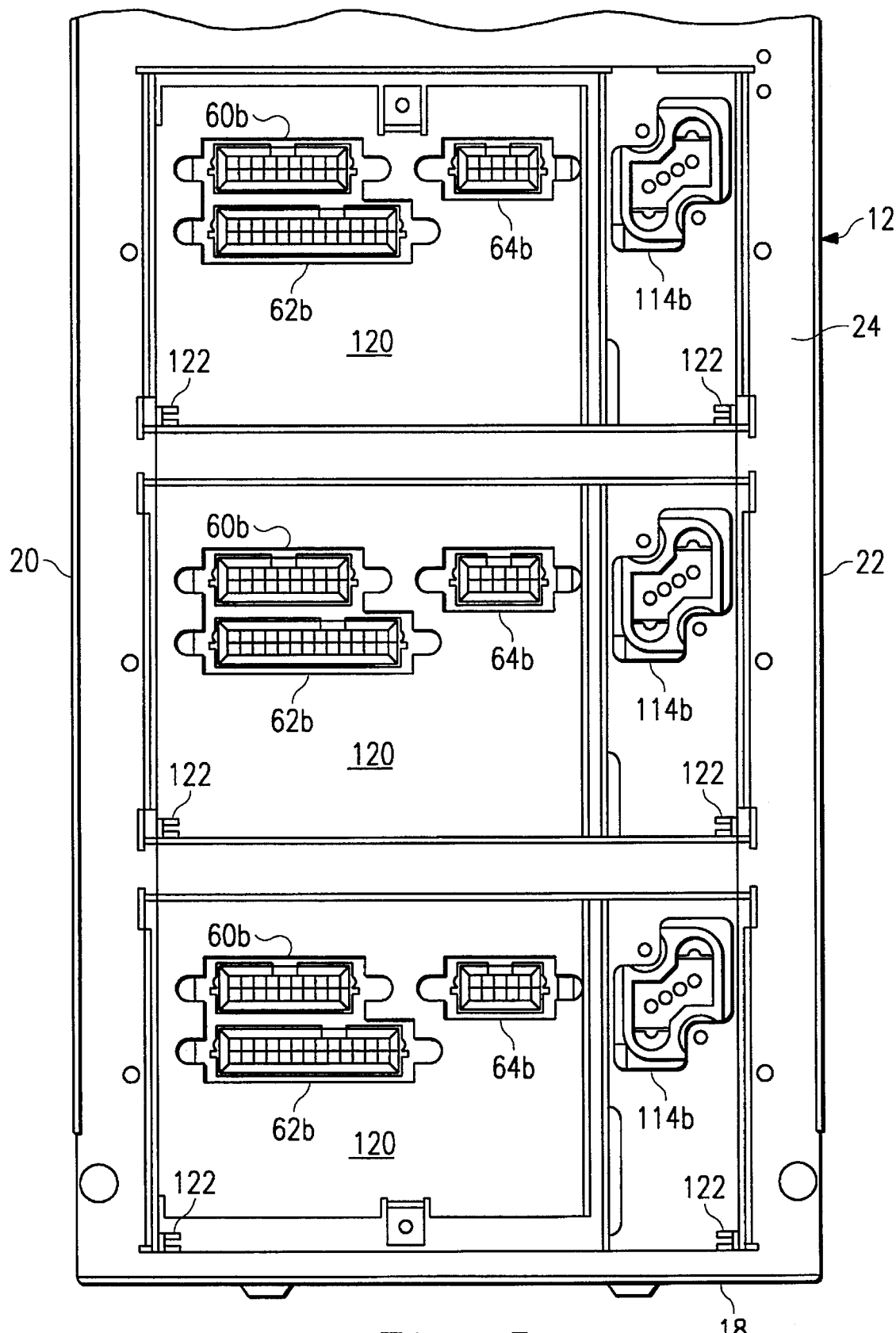
FIG. 5 is an enlarged scale cross-sectional view through a portion of the chassis structure, with the power supply assemblies removed therefrom, taken along line 5—5 of FIG. 1.

Referring now to FIG. 5, the paralleling type circuit board 120 is mounted on the interior surface of the rear side wall 24 of the housing section 12 and cooperate with the carrier-mounted power supply boxes 32 to advantageously provide the computer system with a redundant power supply. Three pairs of opposed horizontal support channel structures 122 are mounted in the interior of the housing section 12 and longitudinally extend from adjacent the circuit board 120 to adjacent the open front side 26 of the housing section 12. As each of the power supply assemblies 14 is inserted through the open from side 26 of the housing section 12, toward the operating positions of the assembly 14 indicated in FIG. 1, the opposite side edge portions 74a of the bottom carrier structure wall 74 enter the appropriate support channel pair 122 and cooperate therewith to guide the power supply assembly into the housing interior and support the assembly therein in a precise predetermined positional relationship with the circuit board 120 associated with the inserted power supply assembly.

Mounted on the from side of the circuit board 120 are three DC connector sockets 60b,62b,64b and an AC socket 114b which are arranged in a positional mirror image of the four outwardly projecting plugs 60,62,64 and 114 mounted on the back side of each of the power supply assemblies 14. Each set of sockets 60b,62b,64b are respectively configured to complimentarily and removably receive the pin portions 66 of the DC plugs 60,62,64 of one of the power supply assemblies 34, and the socket 114b is configured to complimentarily receive the AC plug 114 of the power supply assembly. As a given power supply assembly 34 is fully inserted drawer-like into the interior of the housing section 12 its plugs 60,62,64,114 are automatically inserted into their corresponding sockets 60b,62b,64b,114b in its associated circuit board.

It can thus be seen that each carrier structure 34 functions to support its associated power supply box 32 and align its four plugs 60,62,64,114 with a corresponding set of sockets 60b,62b,64b,114b as the particular power supply assembly 34 is slid into place within the housing section 12, to thereby effect a blind-mate connection between each power supply assembly plug set and its associated socket set within the housing section 12. Accordingly, each carrier structure 34 in effect very economically serves to convert a power supply box 32 of a standard, off-the-shelf mass produced configuration for redundant power supply usage without the expense of modifying the shape or construction of the power supply box.

Before inserting each power supply assembly 34 into the interior of the housing section 12 as described above, its key-operated switch 102 (see FIG. 4) is rotated to its "off" position in which the switch pin 106 is vertically oriented and the switch 102 disables the operation of the power supply box 32. After the power supply assembly 34 has been fully inserted into the interior of the housing section 12 the thumb screws 92,94 are threaded into corresponding openings (not shown) in the front side of the housing section 12 to removably hold the inserted power supply assembly 34 in its inserted operating position.

The key-operated switch 102 is then rotated to bring the switch to its FIG. 4 "on" position, thereby causing the switch 102, via its leads 106 and 108, to enable the operation of its associated power supply box 32. During operation of the power supply box 32, AC electrical power from an external source thereof is supplied to the power supply box 32, via the socket 114b, the plug 114, the wire 118, the plug 116 and the socket 56 associated with the power supply box. The received AC electrical power is convened to DC electrical power which is operatively transmitted to the paralleling board 120 via the removably interconnected plugs 60,62,64 and sockets 60b,62b,64b.

Rotation of the key-operated switch 102 to its FIG. 4 "on" position also causes the switch pin 102 to be rotated into, and project outwardly through, one of three vertical slots 124 (see FIG. 2) formed in the right side wall 22 of the housing section 12. When the switch key is subsequently removed from the switch 102, the receipt of the pin 106 in its associated housing section side wall slot 124 releasably locks the power supply assembly 34 within the housing section 12 until the key is subsequently used to rotate the switch 102 back to its "off" position to permit removal of the power supply assembly 34 from the housing section 12.

The foregoing detailed description is to be clearly understood as being given by way of illustration and example only, the spirit and scope of the present invention being limited solely by the appended claims.

What is claimed is:

1. Computer apparatus comprising:

a first housing having a wall opening therein;

a circuit board supported in said first housing and having a side spaced apart from and facing said wall opening;

a spaced plurality of first electrical connectors mounted on said side of said circuit board;

a power supply box structure including a second housing, a plurality of electrical leads extending outwardly from said second housing and having outer ends, and a plurality of second electrical connectors coupled to said outer ends and being removably mateable with said first electrical connectors; and a carrier structure mounted on said first housing for drawer-like movement through said wall opening toward and away from said side of said circuit board, said second housing being removably disposed within said carrier structure for movement therewith relative to said first housing, said carrier structure supporting said second electrical connectors in a manner such that they project from said carrier structure toward said first electrical connectors, are in a mirror image positional relationship therewith, and are removably rotatable with said first electrical connectors in response to movement of said carrier structure relative to said first housing into adjacency with said circuit board.

2. The computer apparatus of claim 1 wherein:

said second electrical connectors are multi-pin, blind mate type connectors.

3. The computer apparatus of claim 1 wherein said carrier structure includes:

a first wall disposed generally parallel to said side of said circuit board and having a spaced plurality of openings therein that complimentarily receive portions of said second electrical connectors, and a second wall extending transversely to said first wall and removably secured to said second housing.

4. Computer apparatus comprising:

a first housing having a wall opening therein;

a circuit board supported in said first housing and having a side spaced apart from and facing said wall opening;

a spaced plurality of first electrical connectors mounted on said side of said circuit board;

a power supply box structure including a second housing, a plurality of electrical leads extending outwardly from said second housing and having outer ends, and a plurality of second electrical connectors coupled to said outer ends and being removably mateable with said first electrical connector; and a carrier structure including:
  a first wall disposed generally parallel to said side of said circuit board and having a spaced plurality of openings therein that complimentarily receive portions of said second electrical connectors,
  a second wall extending transversely to said first wall and removably secured to said second housing,
  a third wall spaced apart from, parallel to and facing said first wall, said second housing being disposed between said first and third walls, and
  switch means carried on said third wall and being operable to selectively enable and disable operation of said power supply box structure;

said carrier structure mounted on said first housing for movement through said wall opening toward and away from said side of said circuit board, said carrier structure supporting said second housing for movement therewith relative to said first housing, and supporting said second electrical connectors in a manner such that they project from said carrier structure toward said first electrical connectors, are in a mirror image positional relationship therewith, and are removably mateable with said first electrical connectors in response to movement of said carrier structure relative to said first housing into adjacency with said circuit board.

5. The computer apparatus of claim 4 wherein:
said switch means are key-rotatable between "on" and "off" positions and are further operable, when said carrier structure is adjacent said side of said circuit board and said switch means are rotated to said "on" position thereof, to releasably lock said carrier structure to said first housing.

6. The computer apparatus of claim 5 wherein: said first housing has a wall portion extending generally transverse to said side of said circuit board and having a locking opening therein, and said switch means have a locking member positioned to be moved into said locking opening when said carrier structure is adjacent said side of said circuit board and said switch means are rotated to said "on" position thereof.

7. The computer apparatus of claim 1 wherein said first and second electrical connectors are DC connectors and said computer apparatus further comprises:
  a first AC connector mounted on said side of said circuit board,
  a second AC connector mounted on said carrier structure and positioned to be removably and matingly engaged with said first AC connector in response to moving said carrier structure into adjacency with said side of said circuit board,
  a third AC connector carried on said second housing,
  a fourth AC connector removably and matingly engaged with said third AC connector, and
  wiring means electrically coupling said second and fourth AC connectors.

8. The computer apparatus of claim 1 wherein:
said computer apparatus further comprises a spaced apart pair of parallel, opposed support channel structures mounted in said first housing and longitudinally extending transversely to said side of said circuit board, and
said carrier structure has a wall upon which said second housing is removably mounted, said wall having opposite side edge portions slidingly received in said support channel structures.

9. A power supply assembly for a computer, comprising:
  a power supply box structure including a housing having a first end wall, a plurality of DC electrical output leads extending outwardly from said first end wall and having outer ends, and a plurality of blind mate type DC electrical connectors operatively connected to said outer ends;
  a carrier structure for receiving therein said power supply box structure and having a bottom wall with a top side and a transverse rear end wall projecting upwardly from said bottom wall, said rear end wall having a spaced plurality of openings diagnosed therein, said openings receiving said DC electrical connectors and holding them in a predetermined relative orientation with portions thereof projecting rearwardly beyond said rear end wall; and
  mounting means for removably securing said housing to said bottom carrier structure wall forwardly of said rear end wall, with said first end wall of said housing facing said rear end wall of said carrier structure.

10. A power supply assembly for a computer, comprising:
  a power supply box structure including a housing having a first end wall, a second end wall opposite said first end wall, a plurality of DC electrical output leads extending outwardly from said first end wall and having outer ends, and a plurality of blind mate type DC electrical connectors operatively connected to said outer ends;
  a carrier structure having a bottom wall with a top side and a transverse rear end wall projecting upwardly from said bottom wall, a transverse front end wall projecting upwardly from said bottom wall forwardly of said second end wall of said housing, said rear end wall having a spaced plurality of openings disposed therein, said openings receiving said DC electrical connectors and holding them in a predetermined relative orientation with portions thereof projecting rearwardly beyond said rear end wall; and
  mounting means for removably securing said housing to said bottom carrier structure wall forwardly of said rear end wall, with said first end wall of said housing facing said rear end wall of said carrier structure.

11. The power supply assembly of claim 10 wherein:
said front and rear end walls of said carrier structure have upper edge portions, and
said carrier structure further has a top wall extending between and connected to said upper edge portions, said top wall being disposed above said housing.

12. The power supply assembly of claim 10 further comprising:
  an opening formed in said front end wall of said carrier structure,
  a first AC connector supported on said rear end wall of said carrier structure and projecting rearwardly therefrom,
  a second AC connector coupled to said first AC connector by a power wire, and
  a third AC connector mounted on said second end wall of said housing and accessible through said opening in said front end wall of said carrier structure, said second and third AC connectors being matingly engageable with one another.

13. The power supply assembly of claim 10 further comprising:

switch means carried on said front end wall of said carrier and operable to selectively enable and disable operation of said power supply box structure.

14. The power supply assembly of claim 13 wherein:

said power supply assembly is removably insertable into a computer housing, and said switch means are further operable to releasably lock said power supply assembly within the computer housing.

15. Computer apparatus having a redundant power supply and comprising:

a first housing having a wall opening therein;

a paralleling circuit board supported in said first housing, said circuit board having a side spaced apart from and facing said wall opening;

spaced pluralities of first electrical connectors mounted on said side of said circuit board; and a plurality of power supply assemblies each including:
a carrier structure mounted on said first housing for drawer-like movement through said wall opening toward and away from said side of said circuit board, said second housing being removably disposed within said carrier structure for movement therewith relative to said first housing, said carrier structure supporting said second electrical connectors in a manner; and a power supply box removably disposed within said carrier structure and including a second housing secured to said bottom wall of said carrier structure, forwardly of said rear end wall, for movement therewith relative to said first housing, a plurality of electrical leads extending outwardly from said second housing and having outer ends, and a plurality of second electrical connectors coupled to said outer ends, said second electrical connectors having portions complimentarily received in said carrier structure rear end wall openings and projecting rearwardly from said carrier structure rear end wall, said second electrical connectors being operatively mateable with said first electrical connectors on said circuit board in response to movement of said carrier structure into adjacency with said circuit board.

16. The computer apparatus of claim 15 wherein:

said second electrical connectors are multi-pin, blind mate type connectors.

17. The computer apparatus of claim 15 wherein said first and second electrical connectors are DC connectors and said computer apparatus further comprises, for each of said carrier structure:

a first AC connector mounted on the circuit board side associated with the carrier structure, a second AC connector mounted on the carrier structure and positioned to be removably and matingly engaged with said first AC connector in response to moving the carrier structure into adjacency with its associated circuit board side, a third AC connector carded on the power supply box associated with the carrier structure, a fourth AC connector removably and matingly engaged with said third AC connector, and wiring means electrically coupling said second and fourth AC connectors.

18. Computer apparatus having a redundant power supply system and comprising:

a first housing having a wall opening therein;

first and second generally coplanar paralleling circuit boards supported in said first housing, each of said circuit boards having a side spaced apart from and facing said wall opening;

spaced pluralities of first electrical connectors mounted on said sides of said first and second circuit boards; and a plurality of power supply assemblies each including:
a carrier structure including:
a front end wall projecting upwardly from the carrier structure bottom wall in front of its associated power supply box, and
switch means carried on said front end wall and being operable to selectively enable and disable operation of the power supply box carried by the carrier structure bottom wall;
said carrier structure mounted on said first housing for movement through said wall opening toward and away from one of said circuit board sides, said carrier structure having a bottom wall extending generally perpendicularly to said circuit boards, and a transverse rear end wall facing said side of one of said circuit boards, said rear end wall having a spaced plurality of openings therein, and
a power supply box including a second housing secured to said bottom wall of said carrier structure, forwardly of said rear end wall, for movement therewith relative to said first housing, a plurality of electrical leads extending outwardly from said second housing and having outer ends, and a plurality of second electrical connectors coupled to said outer ends, said second electrical connectors having portions complimentarily received in said carrier structure rear end wall openings and projecting rearwardly from said carrier structure rear end walls said second electrical connectors being operatively mateable with said first electrical connectors on said one of said circuit boards in response to movement of said carrier structure into adjacency with said one of said circuit boards.

19. The computer apparatus of claim 18 wherein each carrier structure further includes:

a top wall extending between the carrier structure front and rear end walls and disposed above their associated power supply box.

20. The computer apparatus of claim 18 wherein:

said switch means are key-rotatable between "on" and "off" positions and are further operable, when the carrier structure is adjacent its associated circuit board side and said switch means are rotated to said "on" position thereof, to releasably lock the carrier structure to said first housing.

21. The computer apparatus of claim 20 wherein:

said first housing has a wall portion extending generally transverse to said circuit board and having a spaced plurality of locking openings therein, and each of said switch means has a locking member positioned to be moved into one of said locking openings when its associated carrier structure is adjacent its associated circuit board side and the switch means is rotated to said "on" position thereof.

22. Computer apparatus having a redundant power supply system and comprising:

a first housing having a wall opening therein;

first and second generally coplanar paralleling circuit boards supported in said first housings, each of said circuit boards having a side spaced apart from and facing said wall opening;

spaced pairs of parallel guide channel structures mounted in said first housing and longitudinally extending transversely to said circuit boards;

spaced pluralities of first electrical connectors mounted on said sides of said first and second circuit boards;

a plurality of power supply assemblies each including:

a carrier structure mounted on said first housing for movement through said wall opening toward and away from one of said circuit board sides, said carrier structure having a bottom wall extending generally perpendicularly to said circuit boards, and a transverse rear end wall facing said side of one of said circuit boards, said bottom wall of said carrier structure having opposite side edge portions slidingly received in said guide channel structure and said rear end wall having a spaced plurality of openings therein, and a power supply box including a second housing secured to said bottom wall of said carrier structure, forwardly of said rear end wall, for movement therewith relative to said first housing, a plurality of electrical leads extending outwardly from said second housing and having outer ends, and a plurality of second electrical connectors coupled to said outer ends, said second electrical connectors having portions complimentarily received in said carrier structure rear end wall openings and projecting rearwardly from said carrier structure rear end wall, said second electrical connectors being operatively mateable with said first electrical connectors on said one of said circuit boards in response to movement of said carrier structure into adjacency with said one of said circuit boards.

\* \* \* \* \*

UNITED STATES PATENT AND TRADEMARK OFFICE
CERTIFICATE OF CORRECTION

PATENT NO. : 5,612,854

DATED : March 18, 1997

INVENTOR(S) : Nathan Wiscombe, Arthur Lopez and Victor Pecone

It is certified that error appears in the above-indentified patent and that said Letters Patent is hereby corrected as shown below:

Column 2, line 8, "from" should read --front--.

Column 3, line 38, "walks 42" should read --walls 42--.

Column 3, line 38, "walks 46" should read --walls 46--.

Column 4, line 6, "fight" should read --right--.

Column 4, line 7, "from" should read --front--.

Column 4, line 12, "fight" should read --right--.

Column 4, line 18, "from" should read --front--.

Column 5, line 9, "mourned" should read --mounted--.

Column 5, line 13, "from" should read --front--.

Signed and Sealed this

Second Day of September, 1997

*Attest:*

BRUCE LEHMAN

*Attesting Officer*  Commissioner of Patents and Trademarks